United States Patent [19]
Kita

[11] Patent Number: 4,711,134
[45] Date of Patent: Dec. 8, 1987

[54] TORQUE DETECTOR

[75] Inventor: Toru Kita, Yokosuka, Japan

[73] Assignee: Nissan Motor Co., Ltd., Yokohama, Japan

[21] Appl. No.: 764,075

[22] Filed: Aug. 9, 1985

[30] Foreign Application Priority Data

Aug. 13, 1984 [JP] Japan .................. 59-123856[U]

[51] Int. Cl.⁴ .............................................. G01L 3/10
[52] U.S. Cl. .................................................. 73/862.36
[58] Field of Search ........... 73/862.32, 862.33, 862.34, 73/862.35, 862.36

[56] References Cited

U.S. PATENT DOCUMENTS 4,173,265 11/1979 Kremer ..................... 73/862.33 X
4,364,278 12/1982 Horter et al. ................. 73/862.36
4,492,906 1/1985 Goto et al. ................. 73/862.34 X Primary Examiner—Charles A. Ruehl
Attorney, Agent, or Firm—Schwartz, Jeffery, Schwaab, Mack, Blumenthal & Evans

[57] ABSTRACT

A torque detector for detection of torque on a driving shaft consisting of a pair of separated shafts. The detector comprises a magnetostrictive cylinder with one end coupled to one separated shaft and the other end coupled to the other separated shaft through an elastic member.

9 Claims, 5 Drawing Figures

TORQUE DETECTOR

BACKGROUND OF THE INVENTION

This invention relates to a torque detector in which torque is detected by torsion produced in a shaft, which in turn produces a change in some observable quantity such as magnetic induction, electromotive force or phase angle.

An example of a conventional torque detector is shown in FIG. 2.42 on page 25 of the Japanese Industrial Electronics Measurements Handbook (published by Nikkan Kogyo Shimbun Sha, March 1970). This torque detector has a pair of magnetic excitation coils mounted on the outer circumference of a transmission shaft. The coils are spaced from each other by a predetermined distance. The torque detector also includes a pair of output pickup coils which are separated from each other by a predetermined distance in the axial direction of the transmission shaft, which direction is perpendicular to the direction of a line through the two excitation coils. Using the fact that the magnetic permeability of the transmission shaft varies corresponding to the amount of torsion in the transmission shaft produced by the torque, the torque is detected based on the voltage corresponding to the amount of torsion output by the said pair of pickup coils.

An example of such a torque detector is a steering torque detector installed in an automobile for use in conjunction with a steering device. In this case the transmission shaft is divided into two shafts in the axial direction and a magnetostrictive cylindrical body is affixed to ends of the first and second shafts. The shafts are coupled with each other through a stopper mechanism which couples them solidly together in the direction of rotation after their relative rotation exceeds a specified angle. In a low torque region until the stopper mechanism acts, all of the torque is transmitted through the magnetostrictive cylindrical body. In a high torque region, after the stopper mechanism engages, the torque is transmitted through the magnetostrictive cylindrical body and the stopper mechanism.

Because the relative rotation between the two shafts corresponding to the amount of torque is very small, the accuracy of the stopper mechanism directly affects the accuracy of the steering torque detection. Consequently, a problem is presented that in order to improve the accuracy of the torque detection, it is necessary to strictly control the accuracies of machining and assembly of parts constituting the stopper mechanism.

SUMMARY OF THE INVENTION

An object of the invention is to provide a torque detector having high torque detection accuracy.

Another object of the invention is to provide a torque detector having increased durability against excessive steering torque.

A further object of the invention is to provide a torque detector which can provide high torque detection accuracy with only rough control of the accuracy of the machining and assembly of its stopper mechanism.

In this invention, torque is transmitted between a first shaft and a second shaft which have their axes aligned along the same line. In the low torque region, before the two shafts become solidly coupled in the direction of rotation, the accuracy of torque detection is improved because all of the torque is transmitted from one shaft to the other shaft through the torsion member of which at least one end is fixed to the first shaft or the second shaft through a rubbery elastic body. Therefore only rough accuracy is required in the machining and assembly of the stopper mechanism provided that the stopper mechanism has the necessary mechanical strength.

BRIEF DESCRIPTION OF THE DRAWINGS

The invention will now be explained with reference to the preferred embodiments shown in the drawing, wherein.

DETAILED DESCRIPTION OF THE PREFERRED EMBODIMENT

Figure 1:
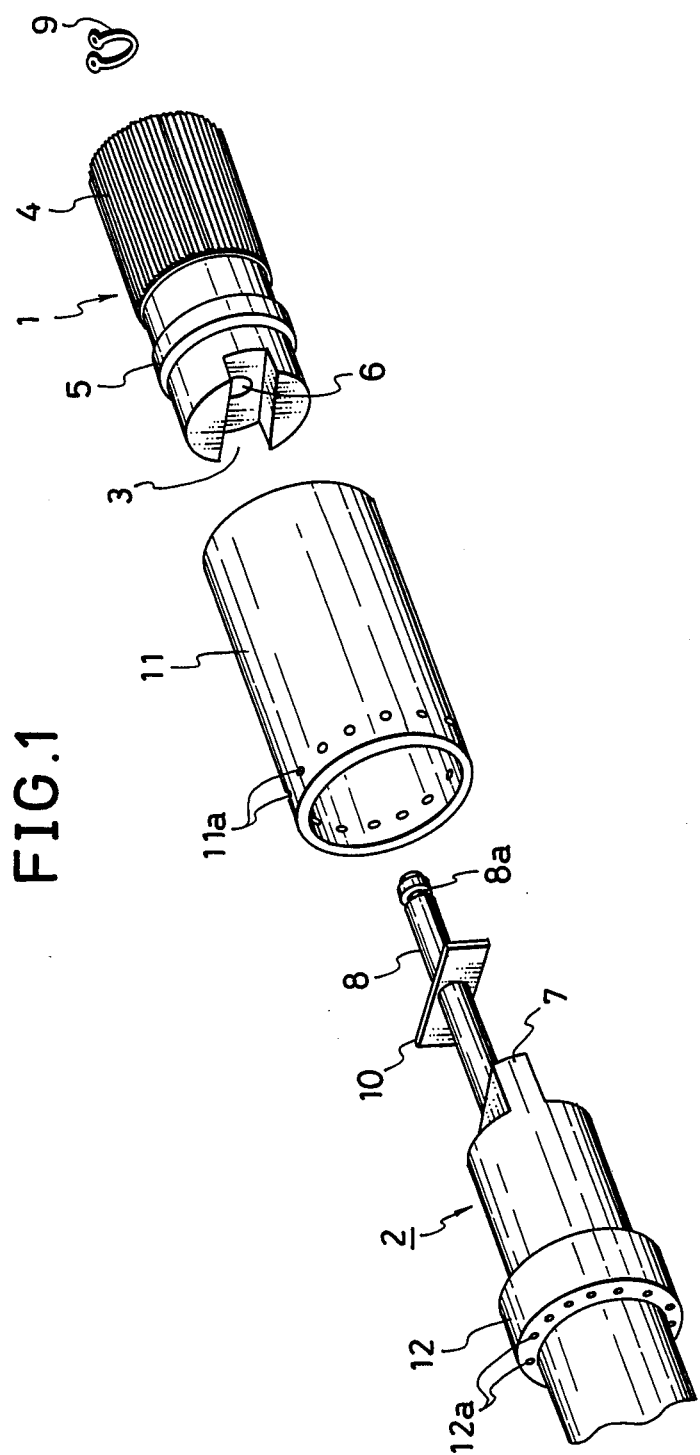
FIG. 1 is a perspective exploded view showing a torque detector according to one embodiment of this invention.
Figure 2:
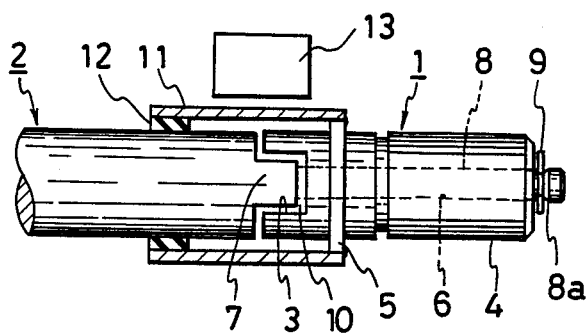
FIG. 2 is a partially sectional side view showing a cross-section of the torque detector of FIG. 1 when fully asssembled.

FIG. 1 and FIG. 2 show one embodiment of the present invention. They show a steering torque detector which is installed in an automobile in connection with a steering mechanism.

First the construction of the detector will be described. An upper shaft 1 is one example of a first shaft, and a lower shaft 2 is one example of a second shaft. A steering shaft consists of the two shafts 1 and 2. A steering wheel, not shown in the figure, is fixed to the upper end of the upper shaft 1. A steering gear, also not shown in the figures, is coupled to the lower end of the lower shaft 2. The steering wheel turns car wheels through the steering mechanism which includes the first and second shafts and the steering gear.

A diametric groove 3 is located at the lower end of the upper shaft 1, and around the outer circumference of the upper end of the upper shaft 1 are serrations 4. The upper shaft 1 has a flange 5 between these serrations 4 and the diametric groove 3. A hole 6 extends through the center of the upper shaft 1 in the axial direction. One end of the hole 6 is in the center of the bottom surface of the diametric groove 3. A steering wheel, not shown in the figure, is coupled to the serrations 4 of the upper shaft 1.

The lower shaft 2 has a protrusion 7 which extends in the diametric direction at the upper end of the lower shaft 2, and a centering shaft 8 extends axially from the center of this protrusion 7. When the steering mechanism is fully assembled the centering shaft 8 passes through the diametric groove 3 and the hole 6, and its tip passes through and extends beyond the upper end of the upper shaft where the serrations 4 are located. At the same time, the protrusion 7 fits into the diametric groove 3, leaving a predetermined gap between them. A snap ring 9 is fitted onto a ring groove 8a disposed in a protruding end portion 7 of the centering shaft 8 to prevent the lower shaft 2 from falling out of the upper shaft 1.

The diametric groove 3 and the protrusion 7 constitute a stopper mechanism. This stopper mechanism permits the upper shaft 1 and the lower shaft 2 to rotate relative to each other up to a predetermined angle. When that angle is exceeded the stopper mechanism couples the shafts 1 and 2 together in the direction of rotation.

A spacer 10 is inserted between the upper shaft 1 and the lower shaft 2 which absorbs the play between the shafts 1 and 2. The surfaces of the spacer 10, the centering shaft 8 and the hole 6 are preferably coated with a polymer material such as Teflon to reduce the coefficient of friction between them and make it easier for them to mutually slide.

In the preferred embodiment, a magnetostrictive cylindrical body 11 of a highly magnetostrictive material such as permalloy is located coaxially with and on the outside of coupling portions of the shafts 1 and 2 so as to enclose the stopper mechanism. One end of the magnetostrictive cylindrical body 11 is rigidly coupled to the outside of the flange 5 on the upper shaft 1 by some joining arrangment such as a weld, and the other end thereof is flexibly coupled to a rubbery elastic body 12 which is fitted around the outside of the lower shaft 2. The rubbery elastic body 12 may, for example, be an annular rubber ring which is joined to the magnetostrictive cylindrical body 11 and the lower shaft 2 by an adhesive. In the alternative, a rubber material may be injected between the magnetostrictive cylindrical body 11 and the lower shaft 2 and then vulcanized therebetween. Referring to FIG. 1, the strength of the bond between the rubbery elastic body 12, the magnetostrictive cylindrical body 11 and the lower shaft 2, can be increased by disposing holes 11a in the radial direction through the magnetostrictive cylincrical body 11 or by disposing surface irregularities on the body 11 such as grooves. Other suitable variations would be apparent to one of ordinary skill in the art upon becoming familiar with the present disclosure.

In addition, the elastic coefficient of the rubbery elastic body 12 can be adjusted by providing axial holes 12a or grooves in the axial direction. This arrangement permits adjustment of the relative torsional angular displacement between the shafts 1 and 2 for a given transmitted torque.

A block 13 in FIG. 2 represents a magnetostrictive detecting device for detecting magnetic variations produced in the magnetostrictive cylindrical body 11 by the relative rotational displacement thereof corresponding to the torque. A detailed description of the detecting device is omitted here because it is well-known and has been referenced such as the Industrial Electronics Measurements Handbook.

The torque detection method is not restricted to the one in this particular embodiment, but a variety of torque detection methods can be used. For example, in an alternative method, the torque is used to twist a transmission shaft which in turn produces a change in resistance, electromotive force or phase angle in a transducer. Or a transducer can be used to detect the torque by some means such as converting the angular displacement produced corresponding to the torsion in a transmission shaft to a variation in light intensity which is then converted by a photocell or photo transistor to a variation in photoelectricity or photocurrent.

The operation of this torque detector is explained below.

Figure 3:
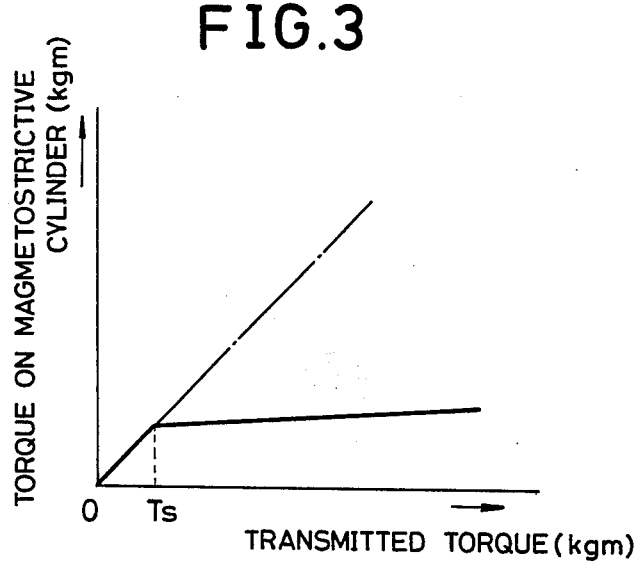
FIG. 3 is a diagram showing the relation between torque transmitted to the torque detector according to the invention and torque which acts on a magnetostrictive detection member.
Figure 4:
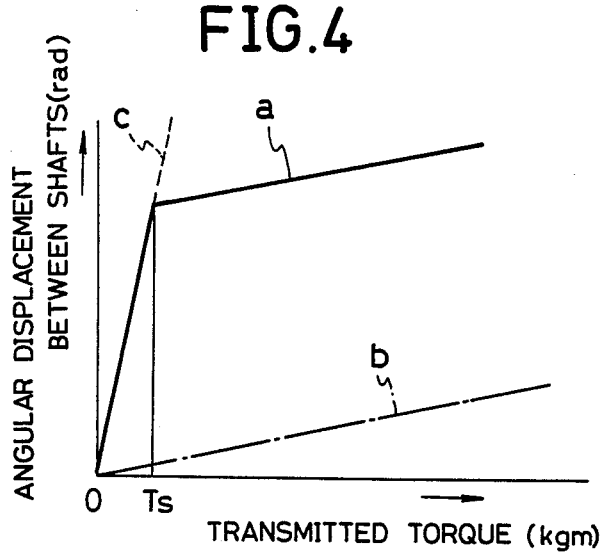
FIG. 4 is a diagram which shows the relation between the same transmitted torque as in FIG. 3 and relative rotational displacement between two shafts.

FIG. 3 is a diagram which shows the relation between the torque transmitted between the upper shaft 1 and the lower shaft 2, and the torque which acts on the magnetostrictive cylindrical body 11. FIG. 4 is a diagram which shows the relation between the torque transmitted between the shafts 1 and 2 and their relative displacement.

When a steering wheel, which is used to steer a vehicle, is turned, the upper shaft 1 turns together with the steering wheel. Then, in the low torque region in which the protrusion 7 of the lower shaft 2 has not yet engaged with the diametric groove 3 in the upper shaft 1 so that the stopper mechanism does not yet act (the transmitted torque T is not greater than a critical value Ts), all of the torque transmitted to the upper shaft 1 is transmitted from the flange 5 through the magnetostrictive cylindrical body 11 and the rubbery elastic body 12 to the lower shaft 2.

In this case, the magnetostrictive cylindrical body 11 is rigidly fixed at one end to the upper shaft 1 through the flange 5, and at the other end is flexibly fixed to the lower shaft 2 through the rubbery elastic body 12, so that even if the torque is very small, it is very easy to produce a relative rotational displacement between the upper shaft 1 integrally together with cylindrical body 11 and the lower shaft 2.

At this time, the ratio of the torque transmitted between the shafts 1 and 2 to the torque which acts on the magnetostrictive cylindrical body 11, as shown in FIG. 3, is 1:1 until the torque has reached the critical torque Ts. The relative angular displacement produced by this torque transmitted between the shafts 1 and 2, as shown by solid line a in FIG. 4, produces a very large increase in torsion angle for a given increase in transmitted torque, since the elastic coefficient of the rubbery elastic body 12 is several hundred to several tens of thousands times smaller than the elastic coefficient of the rigid shafts. In FIG. 4, dot-dash line b shows the relation between the transmitted torque and the torsion angle when the two shafts 1 and 2 are considered to form a single solid rod. Broken line c shows the relation between the torque transmitted through the rubbery elastic body 12 and the torsion angle when the shafts 1 and 2 are coupled to each other only through the rubbery elastic body 12.

Figure 5:
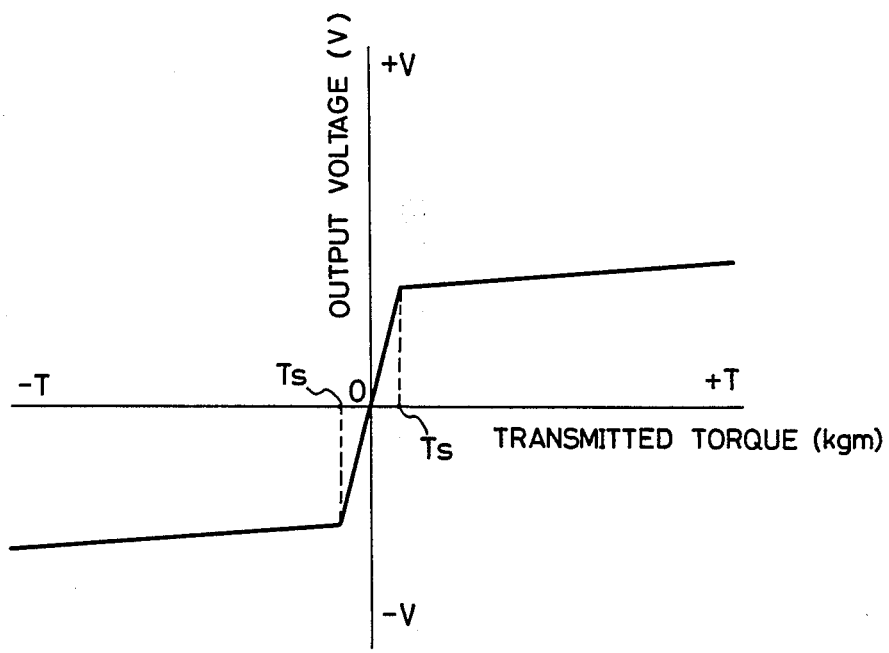
FIG. 5 is a diagram which shows the relation between the transmitted torque and output voltage.

As explained above, when the upper shaft 1 and the lower shaft 2 rotate with respect to each other, the magnetostrictive detection means 13 which faces the outside of the magnetostrictive cylindrical body 11 outputs an output voltage V corresponding to the rotational displacement, as shown in FIG. 5. Thus, by increasing the rate of change of the relative rotational displacement between the shafts 1 and 2 with respect to the rate of increase of the transmitted torque T, the torsion angle displacement in the outer circumference of the shaft can be increased, by suitably adjusting the hardness and structure of the rubbery elastic body 12, to an order of several um from the conventional order of several mm.

Consequently, it is possible to change the accuracy required for machining and assembling the stopper mechanism, by virtue of the increase in detection rotation angle, from the order of um to the order of mm, without changing the detection accuracy of the torque detector. As a result, the accuracy of the steering mechanism can be greatly reduced, which can contribute greatly to making torque detectors mass-producible.

The above mentioned low-torque region is determined by the relative rotational angle formed by the stopper mechanism.

Next, when the transmitted torque increases and has exceeded the critical value Ts, the protrusion 7 meshes with the radial groove 3, so that the stopper mechanism acts. In a high-torque region in which this stopper mechanism acts, the upper shaft 1 and the lower shaft 2 become equivalent to a single shaft, so that most of the torque applied to the upper shaft 1 is transmitted directly to the lower shaft 2, and only one part of the torque is transmitted from the flange 5 through the magnetostrictive cylindrical body 11 and the rubbery elastic body 12 to the lower shaft 2. For this reason, as is clear from FIG. 3, the rate of increase of the torque which acts on the magnetostrictive cylindrical body 11 is very small compared with the total rate of increase of the applied torque. In addition, as is clear from FIG. 4, the rate of increase of the relative rotational angular displacement with respect to the rate of increase of the transmitted torque is also greatly reduced.

Suppose that the torque measurement region has a maximum of 2 kgm and the steering wheel has a mechanical strength of 30 kgm. If the critical value of torque Ts at which the stopper mechanism will be engaged is set to be 2 kgm and when the transmitted torque T between the shafts 1 and 2 is in the range 0 to 2 kgm, the actual value of applied torque acts directly on the magnetostrictive cylindrical body 11. But even if the transmitted torque T reaches 30 kgm, the torque acting on the magnetostrictive cylindrical body 11 is only 5 to 6 kgm. For this reason, an excessive steering torque can be prevented from being applied to the magnetostrictive cylindrical body 11, and consequently the durability of the torque detector is greatly increased.

Even in a situation in which the elasticity of the rubbery elastic body 12 varies, for example due to changes over the years, within the range below the torque Ts in which the stopper mechanism is actuated, the full transmitted torque acts on the magnetostrictive cylindrical body 11 without regard to the rigidity of the rubbery elastic body 12, so the relation between the transmitted torque T and the output voltage V does not vary.

In addition, in this embodiment, the magnetostrictive cylinder 11 and the lower shaft 2 have been flexibly coupled to each other through the rubbery elastic body 12, but it is also possible for the magnetostrictive cylinder 11 and the upper shaft 1 to be coupled to each other through a rubbery elastic body, or, alternatively, both shafts 1 and 2 can be coupled to the magnetostrictive cylincrical body through rubbery elastic bodies. Any of these configurations will produce the same effect as the embodiment described in detail above. Also, this invention can be applied to a drive shaft torque detector other than a steering torque detector.

It should be understood that the foregoing description relates only to the preferred embodiments of the present invention but numerous modifications and alterations may be made therein without departing from the spirit and scope of the invention.

Thus, it is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A torque detector for detecting torque transmitted between first and second shafts with their axes on the same line comprising:
    stopper means for preventing angular relative movement between the first and second shafts beyond a predetermined value;
    said stopper means having a groove diametrically disposed in the first shaft at one end thereof and a projection disposed in the second shaft at one end thereof, the projection being fitted into the diametric groove;
    a magnetostrictive member for transmitting torque between the first and second shafts and coupled in a flexible manner to at least one of the first and second shafts; and
    a magnetic sensor for detecting magnetic variations produced in said member by the transmitted torque.

2. The torque detector of claim 1, wherein said magnetostrictive member is flexibly coupled to at least one of the shafts through an elastic member.

3. The torque detector of claim 2, wherein said magnetostrictive member is formed in a cylindrical shape.

4. The torque detector of claim 3, wherein said magnetostrictive member is flexible coupled to at least one of the shafts through a ring-like elastic member fitted around the outside of the shaft.

5. The torque detector of claim 4, wherein said ring-like member is formed with a plurality of holes.

6. The torque detector of claim 5, wherein said holes are orientated in the axial direction and arranged along the circumference of the ring-like member.

7. The torque detector of claim 6, wherein said magnetostrictive member is formed with an irregular inside against which the ring-like member is disposed.

8. The torque detector of claim 7, wherein said irregularity is formed by a plurality of holes in the radial direction.

9. The torque detector of claim 1, wherein said first shaft has a through hole extending therethrough and opening toward said diametric groove and said second shaft has a centering shaft portion which is inserted into said through hole of said first shaft.

* * * * *